United States Patent [19]
Bickford et al.

[11] 3,733,893
[45] May 22, 1973

[54] SURFACE CHARACTERIZATION

[75] Inventors: Harry G. Bickford, Essex Junction; Leonard A. Kieny, Jr., Shelburne; Lewis G. Peltier, Jr., Milton, all of Vt.

[73] Assignee: International Business Machines Corporation, Armonk, N.Y.

[22] Filed: July 12, 1971

[21] Appl. No.: 161,468

[52] U.S. Cl. ..........................73/73, 73/64.4, 73/104
[51] Int. Cl. ........................G01n 13/00, G01n 19/08
[58] Field of Search ....................73/104, 64.4, 15 R, 73/17 A, 73, 76

[56] References Cited

UNITED STATES PATENTS 3,618,374  11/1971  Miller...................................73/104

OTHER PUBLICATIONS

"A Technique for the Microdetermination of Melting and Boiling Points" by Wagner, from Microchemical Journal, Jan. 1966, pages 461–469, pp. 461–463.

Primary Examiner—James J. Gill
Attorney—Willis E. Higgins et al.

[57] ABSTRACT

An apparatus for characterizing a surface, such as on a semiconductor wafer, includes a heater for establishing controlled temperature conditions, a nitrogen input, and a desiccant for establishing a controlled atmosphere at the surface. A dispensing mechanism provides a known quantity of a liquid in a droplet on the surface. The surface is characterized by determining the evaporation rate of the liquid from the surface under the controlled conditions established by the apparatus. This is usually done by measuring the time for complete evaporation of the droplet to take place. The method is especially suited for characterizing the photoresist application characteristics of semiconductor wafer surfaces.

9 Claims, 5 Drawing Figures

PATENTED MAY 22 1973

INVENTORS
HARRY G. BICKFORD
LEONARD A. KIENY, JR.
LEWIS G. PELTIER, JR.

BY *Willis E. Higgins*
ATTORNEY

SURFACE CHARACTERIZATION

BACKGROUND OF THE INVENTION

1. Field of the Invention

This invention relates to an apparatus and process for characterizing a surface. More particularly, it relates to such an apparatus and process in which a surface is characterized on the basis of evaporation of a liquid from the surface under controlled conditions. The present invention, though giving results which are related to contact angle of a surface being characterized, eliminates the necessity to measure contact angles.

2. Description of the Prior Art

The use of contact angle measurements for characterizing surfaces is well know, as disclosed in, for example, Hunter et al., "Properties of Polyorganosiloxane Surfaces on Glass," Industrial and Engineering Chemistry, 39, 1389 (November 1947), and Berg, "The Correlation Between Water Contact Angle and KPR Adherence on $SiO_2$ Surfaces," J. Electrochem. Soc., 112, 457 April 1965). An indication of the state of the art in contact angle measurement for characterizing surfaces may be found in U.S. Pat. No. 3,525,255.

While the contact angle approach for characterizing surfaces has found wide application for laboratory experimentation purposes, the degree of difficulty and time consuming nature of this technique has made it of limited value for use in in-line manufacturing process control where the nature of a surface is critical to a manufacturing process, such as one in which photoresist is applied to a surface. Thus, despite the existence of well developed methods for measuring contact angles, a need still remains for a surface characterization process which is rapid and simple enough for controlling a manufacturing process in which surface characteristics are critical.

SUMMARY OF THE INVENTION

Accordingly, it is an object of this invention to provide a way to characterize a surface that may be used for in-line monitoring of a process carried out on the surface.

It is another object of the invention to provide a way to make a rapid evaluation of the effect of a process change on characteristics of a surface being treated.

It is still another object of the invention to provide a method for in-process monitoring of semiconductor wafers on which photoresist is to be applied.

It is yet another object of the invention to provide a method for characterizing a surface that is related to contact angle of the surface, but does not require measurement of the contact angle.

The attainment of these and related objects may be achieved through use of the apparatus and process herein disclosed. The present apparatus for characterizing a surface includes means, such as a heater and appropriate temperature measuring means, such as a thermocouple or thermistor, for establishing a given temperature on the surface to be characterized. Means, such as a nitrogen input and a desicant if water is employed as the liquid in practice of the invention, is provided for maintaining a controlled atmosphere at the surface. Means, such as a syringe, is provided for depositing a given quantity of a liquid, such as water, in a droplet on the surface. This apparatus has the capability of establishing controlled conditions of temperature and atmosphere at the surface and depositing a known quantity of the liquid as a droplet on the surface under reproducible conditions. The evaporation rate of the liquid from the surface, when compared with the evaporation rate of the same liquid under these same conditions from another surface, may be used to characterize the comparative natures of the two surfaces.

The simplest method for determining the evaporation rate of the liquid is to measure the time for complete evaporation of the droplet to take place. In the case of evaporation of water from the surface, the evaporation rate has been found to be an excellent measure of the hydrophobic or hydrophillic nature of the surface.

While applicant does not wish to be bound by any particular theory of operation, what apparently occurs is that, with different contact angles, different shape droplets are formed on different surfaces. The evaporation rate of these droplets is dependent on the surface area of the droplet contacting the atmosphere. Since the surface area of a droplet will change with different shaped droplets, different evaporation rates of the same quantity of liquid under the same conditions from different surfaces is an indication of different contact angles.

The surface characterization technique of this invention is very simple, requiring only a few minutes at most to perform. As a result, it can be employed in a manufacturing environment to provide in-line monitoring of processes carried out on a surface. For this reason, the technique is of particular value in characterizing surfaces on semiconductor wafers in integrated circuit manufacturing. The technique allows a quick determination of whether a given batch of semiconductor wafers have surfaces which will allow proper application of photoresist to them. If use of the invention shows that surfaces on a batch of semiconductor wafers are not suitable for application of photoresist, the surfaces may be further treated to make them suitable, then photoresist application carried out. With better control over surface characteristics thus obtained, improved results may be obtained in photoresist processes, giving a material contribution to increased integrated circuit manufacturing yields. These characteristics making the invention of particular value in characterizing semiconductor wafer surfaces for photoresist processing should make the invention of value in a wide variety of other environments in which surface characterization is needed.

The foregoing and other objects, features, and advantages of the invention will be apparent from the following more particular description of a preferred embodiment of the invention, as illustrated in the accompanying drawings.

DESCRIPTION OF THE PREFERRED EMBODIMENT

Turning now to the drawings, more particularly to

Figure 1:
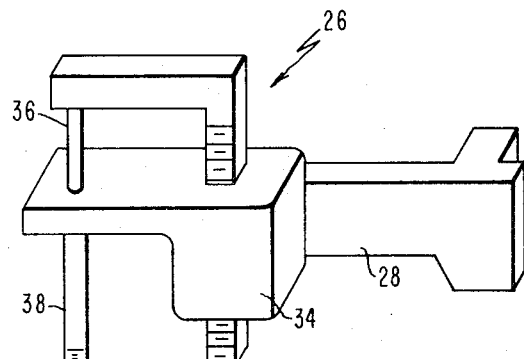
FIG. 1 is a perspective view of apparatus in accordance with the invention.

FIG. 1, there is shown an apparatus in accordance with the invention. The apparatus has a base 10, desirably made of a metal, such as aluminum. The base forms a container for calcium chloride desicant 12, which serves to control humidity within chamber 13 formed by base 10 and transparent plastic cover 14. Inlet 15 supplies nitrogen to establish a nitrogen atmosphere in chamber 13. Disposed within base 10 is a polytetrafluoroethylene pedestal 16, which supports resistance heater coils 18 and aluminum heat sink 20. Thermistor 21 is used to measure the temperature of heat sink 20. The heat sink and resistance heater serve to control the temperature of a surface to be characterized by the apparatus, shown as a silicon semiconductor wafer 22 having a silicon dioxide surface 24. Disposed above the cover 14 is a micrometer syringe 26 and a mechanism 28 for raising and lowering the syringe 26 to allow its needle 30 to be inserted into the chamber 13 through rubber diaphragm 32 on cover 14. Micrometer apparatus 34 of the micrometer syringe 26 engages plunger 36 of the micrometer syringe 26 to dispense water from barrel 38 through needle 30.

In operation, a semiconductor wafer 22 is placed on the surface of aluminum heat sink 20, which is maintained at a predetermined temperature by resistance heater coil 18. Micrometer syringe 26 is positioned through use of vertical adjustment apparatus 28 so that the tip 40 of needle 30 is a predetermined distance above semiconductor wafer 22. Micrometer apparatus 34 is used to dispense a predetermined amount of water through needle 30 to surface 24 of semiconductor wafer 22. The water forms droplet 42 on surface 24. The rate of evaporation of droplet 42 from surface 24 is measured by observing droplet 42 through transparent plastic cover 14 until droplet 42 completes evaporation. The time required for droplet 42 to evaporate is an indication of evaporation rate.

Figure 2A:
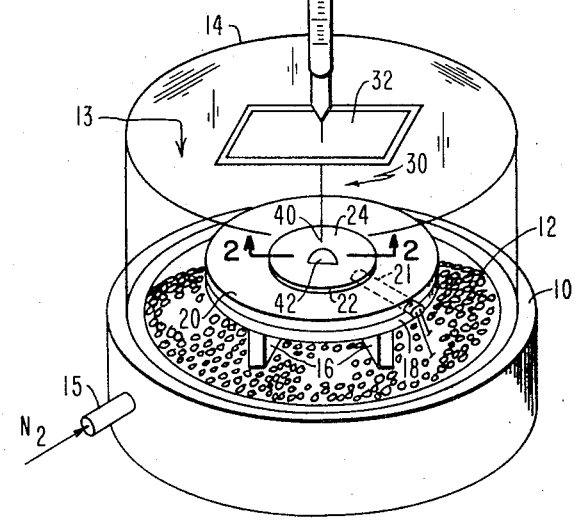
FIGS. 2A–2C are enlarged cross sections taken along the line 2—2 in FIG. 1 and showing the effect of different surfaces to be characterized using the apparatus of the invention.
Figure 2A:
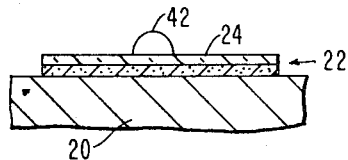
Figure 2C:
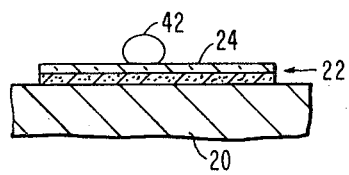
Figure 2B:
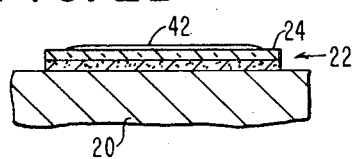

In general, the more hydrophillic is surface 24, the shorter is the evaporation time, and conversely, the longer the evaporation time, the more hydrophobic is surface 24. FIGS. 2A–2C illustrate the reason for this difference. If surface 24 is neither hydrophobic nor hydrophillic, droplet 42 has approximately the shape indicated in FIG. 2A. A droplet with the shape shown in FIG. 2A has, of course, a given surface area from which evaporation can take place.

In FIG. 2B, droplet 42 is shown considerably more spread out on surface 24 of wafer 22, indicating that surface 24 in this case is hydrophillic. This increases the surface area of droplet 42 to a substantial extent thus allowing it to evaporate more rapidly.

In FIG. 2C, surface 24 is hydrophobic, and droplet 42 is almost spherical in shape. The evaporation rate of droplet 42 in FIG. 2C is lower than in either FIG. 2A or FIG. 2B.

In practice, it has been found that silicon dioxide surfaces should either be quite hydrophillic, indicating a high degree of cleanliness, or should have an adhesion promoter applied to them, for example of the type described by Couture et al in commonly assigned U.S. Pat. No. 3,586,554 or by Collins et al in commonly assigned U.S. Pat. No. 3,549,368. Such adhesion promoters produce a strongly hydrophobic surface 24 on semiconductor wafers 22, and evaporation times for droplet 42 indicating that surface 24 is highly hydrophobic show proper treatment with the photoresist adhesion promoter.

The following non-limiting example describes the invention further. Surfaces on semiconductor wafers are characterized using apparatus of the type shown in FIG. 1 at three different stages in integrated circuit manufacture, i.e., after a first oxidation step to produce an $SiO_2$ diffusion mask, after formation of a phosphorous pentoxide ($P_2O_5$) layer on the wafers, and after formation of a final silicon dioxide passivation layer. Wafers at each step are characterized as untreated random laboratory production samples and after modification of the surfaces in four different ways. The modification methods are, cleaning with a solution consisting of 150 ml of 166g $CrO_3$ dissolved in 300 ml deionized water mixed with 2,000 ml of 95.5 weight percent sulfuric acid, treatment in a commercially available ozone asher for 15 minutes utilizing an oxygen input flow rate of 5 cc/minute and 1,000 watts of input power, vacuum baking for 30 minutes at 150°C and treating with a hexamethyldisilizane (HMDS) adhesion promoter in accordance with the teachings of Collins et al., U.S. Pat. No. 3,549,368.

In each case the temperature of aluminum heat sink 20 is stabilized to 160°F, as measured by a thermistor 21. Needle 30 of syringe 26 is inserted through rubber diaphragm 32 and positioned at an angle of 75° with respect to the wafer surface 24 with its tip at a distance of 30/1,000 inch above surface 24. A droplet of deionized water having a volume of 0.010 ml. is ejected from needle 30 to surface 24. The elapsed time to evaporation of the droplet is then measured. The results obtained for characterization of the surfaces of semiconductor wafers treated as above are shown in the following table and in FIG. 3 of the drawings.

Elapsed Evaporation Time (seconds)

| Surface | Chromic-Sulfuric | Asher | Surface Treatment Untreated Lab Sample | Vacuum Bake | HMDS |
|---|---|---|---|---|---|
| First oxidation | 86.0 | 99.3 | 119.4 | 155.4 | 117.4 |
| $P_2O_5$ | 65.5 | 65.0 | 77.7 | 147.5 | 180.0 |
| $SiO_2$ Passivation | 88.0 | 80.7 | 102.4 | 121.3 | 168.7 |

Figure 3:
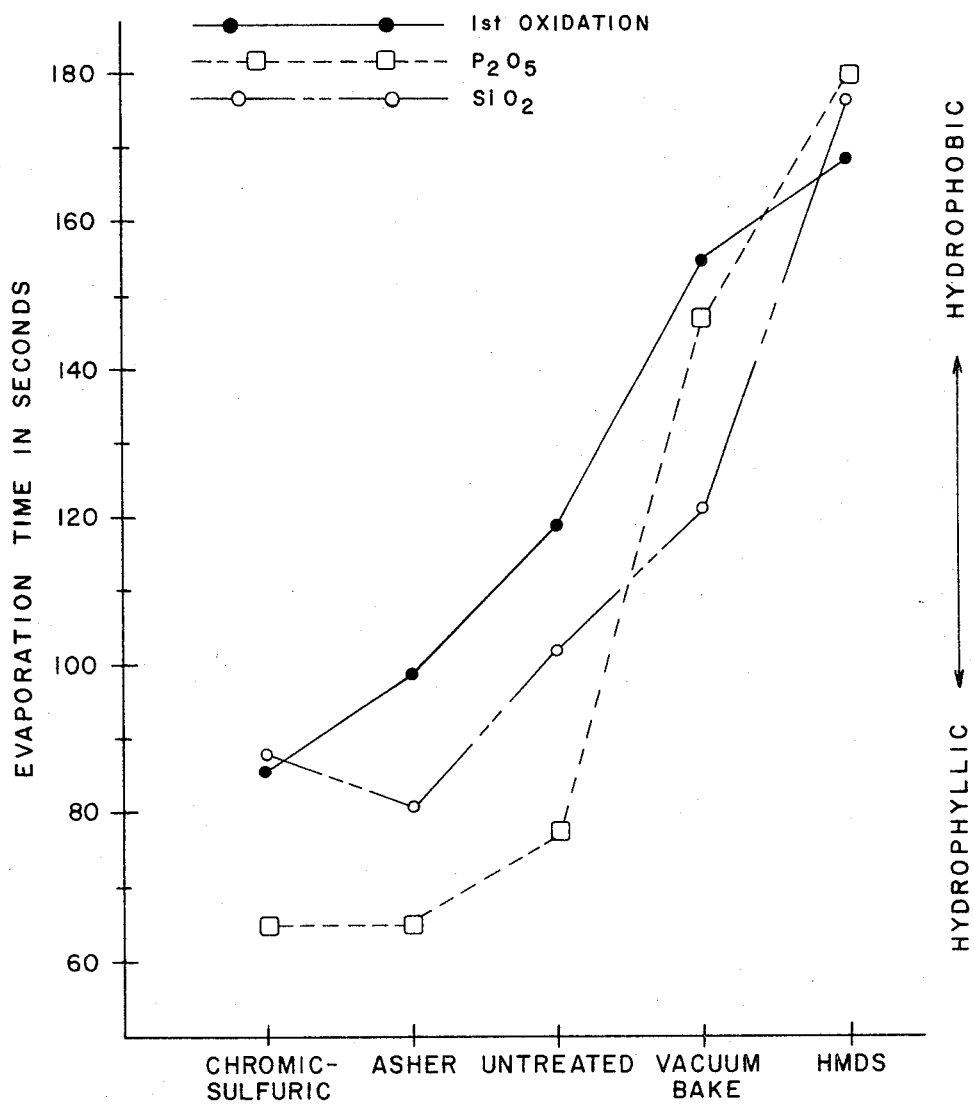
FIG. 3 is a graph showing results obtained through practice of the process of this invention.

In each case, the elapsed evaporation times given are for 10 repeated measurements, which has an average repeatability of ±5 percent. As best shown in FIG. 3, the untreated surfaces tended to be intermediate in character between a hydrophillic and a hydrophobic surface. The surfaces given the chromic-sulfuric acid treatment and the ozone asher treatment are hydrophillic in nature, while the vacuum baked and HMDS treated surfaces are hydrophobic. These results are in accordance with the known effect of the various treatments.

It should now be apparent that an apparatus and process for characterizing surfaces capable of achieving the stated objects of the invention has been provided. In summary, the present droplet evaporation test is quick and easily performed, thus allowing its use as a means of carrying out in-processing monitoring of surface treatments. For the first time, it thus becomes possible in a manufacturing environment to test the suitability of a semiconductor wafer surface for photoresist application, then treat the surface further if the surface is shown to be unsuitable. Doing this should make a significant contribution to increased integrated circuit manufacturing yields.

While the invention has been particularly shown and described with reference to a preferred embodiment thereof, it will understood by those skilled in the art that the foregoing and other changes in form and details may be made therein without departing from the spirit and scope of the invention.

What is claimed is:

1. A process for characterizing affinity of a surface for a liquid, comprising:
   A. establishing controlled conditions of temperature and atmosphere at said surface,
   B. depositing a known quantity of a liquid in a droplet on said surface, and
   C. determining the evaporation rate of said liquid from said surface.

2. The process of claim 1 in which the liquid is water and the process measures the hydrophobic or hydrophyllic nature of the surface.

3. The process of claim 1 in which the evaporation rate is determined by measuring the time for complete evaporation of said droplet to take place.

4. In a semiconductor device manufacturing process, the improvement which comprises:
   A. carrying out the process of claim 1 to determine an evaporation rate which indicates a surface of a given type having desired photoresist application properties,
   B. subsequently, carrying out the process of claim 1 on representative samples of further surfaces of the same given type,
   C. selecting those surfaces having evaporation rates indicating desired photoresist application properties,
   D. carrying out photoresist application and processing on said selected surfaces,
   E. treating remaining surfaces until they have evaporation rates indicating desired photoresist application properties, and
   F. then carrying out photoresist application and processing on said remaining surfaces.

5. A process for determining photoresist application characteristics of a surface, comprising:
   A. establishing controlled conditions of temperature and vapor pressure at said surface,
   B. depositing a known quantity of a liquid in a droplet on said surface, and
   C. measuring the evaporation time of said droplet.

6. The process of claim 5 in which the liquid is water.

7. The process of claim 5 in which the surface is on a semiconductor wafer.

8. Apparatus for characterizing affinity of a surface for a liquid, comprising in combination:
   A. means for establishing a given temperature at said surface,
   B. means for maintaining a controlled atmosphere at said surface, and
   C. means for depositing a given quantity of a liquid in a droplet on said surface, whereby rate of evaporation of said liquid from said surface is used to characterize said surface.

9. The apparatus of claim 8 wherein said liquid is water.

* * * * *